(12) United States Patent
Ding et al.

(10) Patent No.: US 11,025,176 B2
(45) Date of Patent: Jun. 1, 2021

(54) SELF-POWERED WIRELESS OPTICAL COMMUNICATION SYSTEMS AND METHODS

(71) Applicant: Georgia Tech Research Corporation, Atlanta, GA (US)

(72) Inventors: Wenbo Ding, Atlanta, GA (US); Zhong Lin Wang, Atlanta, GA (US); Changsheng Wu, Atlanta, GA (US); Yunlong Zi, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 16/816,646

(22) Filed: Mar. 12, 2020

(65) Prior Publication Data

US 2020/0295675 A1    Sep. 17, 2020

Related U.S. Application Data

(60) Provisional application No. 62/816,942, filed on Mar. 12, 2019.

(51) Int. Cl.
| | |
|---|---|
| *H04B 1/04* | (2006.01) |
| *H04B 10/112* | (2013.01) |
| *H04B 10/69* | (2013.01) |
| *H04B 10/50* | (2013.01) |
| *H02N 1/04* | (2006.01) |

(52) U.S. Cl.
CPC ............ *H02N 1/04* (2013.01); *H04B 10/112* (2013.01); *H04B 10/502* (2013.01); *H04B 10/69* (2013.01)

(58) Field of Classification Search
CPC ...... H02N 1/04; H04B 10/112; H04B 10/502; H04B 10/69
USPC ........................................ 398/182
See application file for complete search history.

(56) References Cited

U.S. PATENT DOCUMENTS

| | | | | |
|---|---|---|---|---|
| 2005/0076534 | A1* | 4/2005 | Ofosu-Asante | D06F 39/02 34/597 |
| 2016/0149518 | A1* | 5/2016 | Wang | H02N 1/04 310/310 |
| 2017/0116827 | A1* | 4/2017 | Clarke-Stone | G08B 7/06 |
| 2018/0294745 | A1* | 10/2018 | Park | C08L 39/08 |
| 2020/0183511 | A1* | 6/2020 | Frescas | G06F 3/041 |

FOREIGN PATENT DOCUMENTS

| | | | |
|---|---|---|---|
| CN | 106730882 A | * 5/2017 | |
| WO | WO-2019135114 A1 | * 7/2019 | ........... H01L 27/305 |

* cited by examiner

*Primary Examiner* — Dalzid E Singh
(74) *Attorney, Agent, or Firm* — Troutman Pepper Hamilton Sanders LLP; Ryan A. Schneider; Dustin B. Weeks

(57) ABSTRACT

An exemplary embodiment of the present invention provides an optical communication system. The optical communication system can comprise a self-powered sensor and an optical array. The self-powered sensor can be configured to receive a mechanical input and generate an electrical signal corresponding to the mechanical input. The optical array can be configured to receive the electrical signal and generate an optical output. The optical output can correspond to the mechanical input.

19 Claims, 17 Drawing Sheets

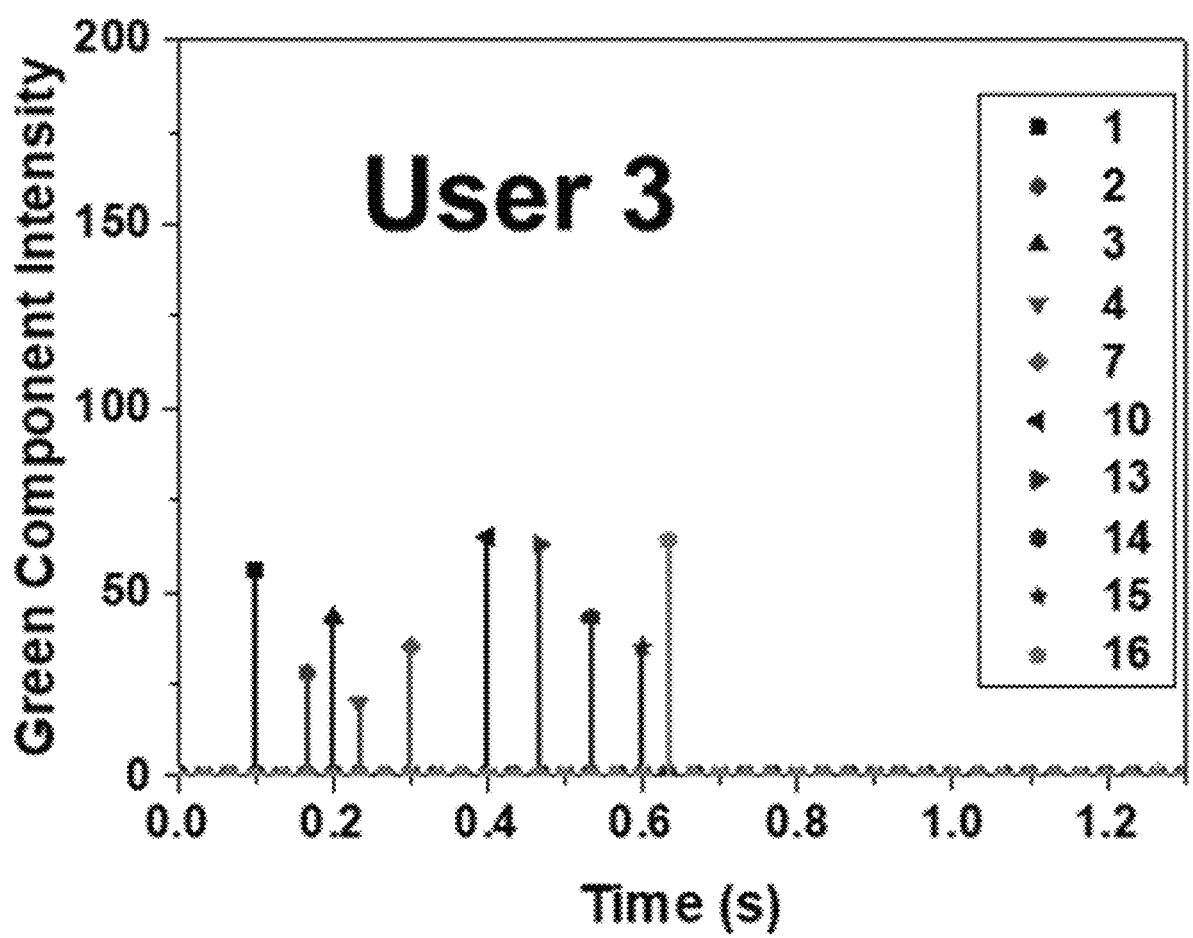

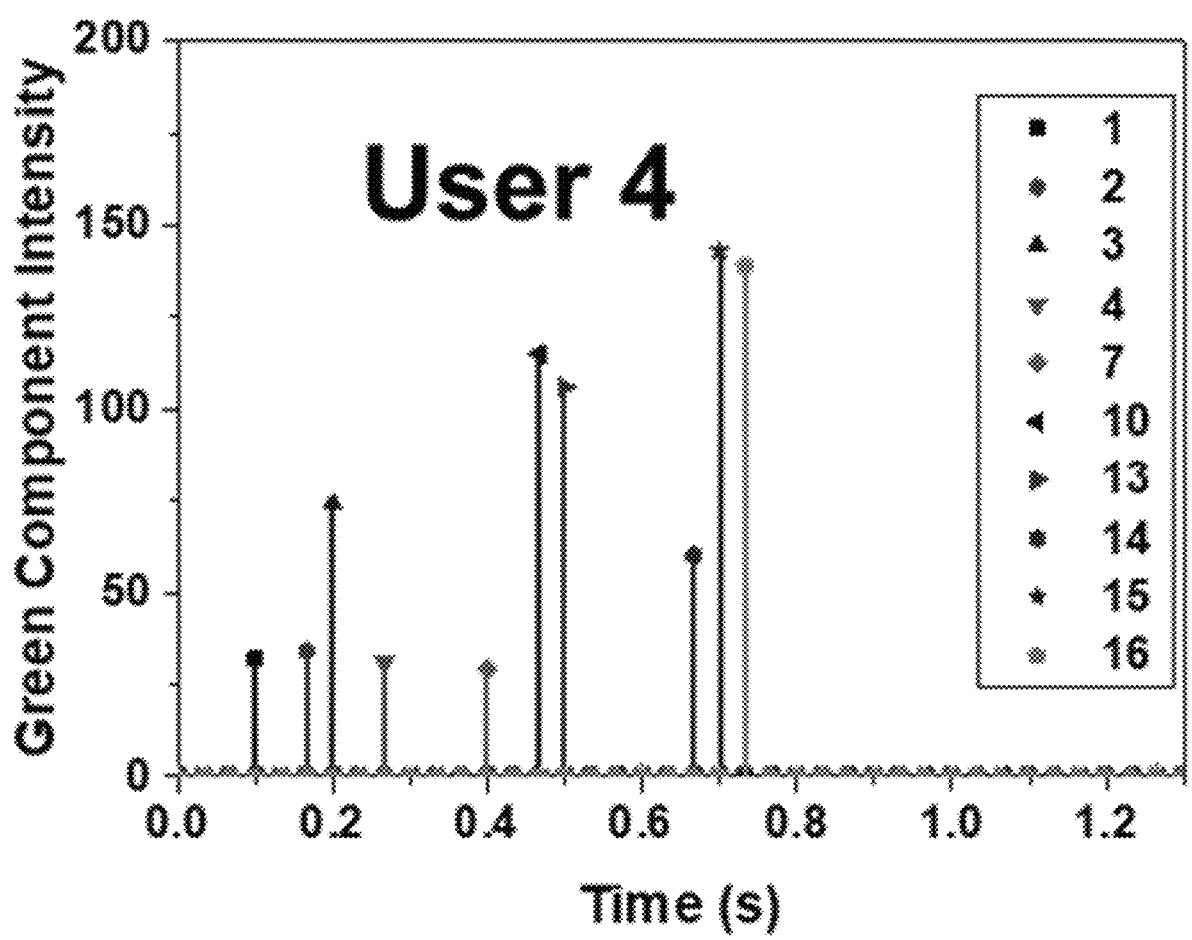

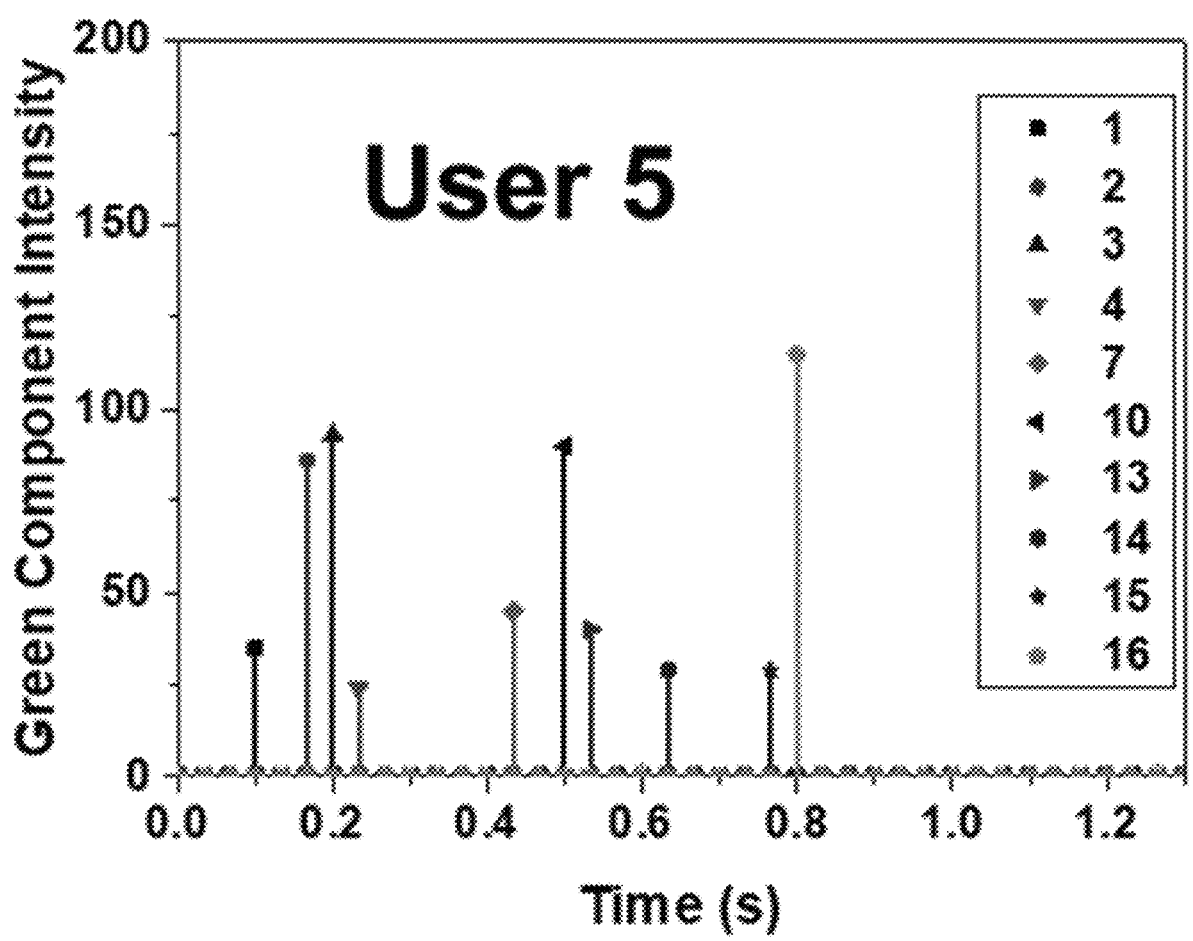

SELF-POWERED WIRELESS OPTICAL COMMUNICATION SYSTEMS AND METHODS

CROSS-REFERENCE TO RELATED APPLICATIONS

This application claims the benefit of U.S. Provisional Application Ser. No. 62/816,942, filed on 12 Mar. 2019, which is incorporated herein by reference in its entirety as if fully set forth below.

TECHNICAL FIELD OF THE INVENTION

The various embodiments of the present disclosure relate generally to communication systems and methods. More particularly, the various embodiments of the present invention are directed to self-powered wireless optical communication systems and methods.

BACKGROUND OF THE INVENTION

With the popularity of Internet of Things (IoT), the ubiquitous existence of sensors has brought great convenience to daily life, but it also raised serious challenges to the wireless communication access. Current solutions for IoT communications are dominated by traditional radio frequency (RF) based techniques, e.g., the wireless local area networks (WLAN), Cellular, Bluetooth, Zigbee, and Radio-frequency identification (RFID) and etc. The RF band of the electromagnetic spectrum, however, is fundamentally limited in capacity and costly because most sub-bands are exclusively licensed, resulting in spectrum crisis especially in areas with higher densities of sensors. Accordingly, optical wireless communications (OWC), which utilize the large and unlicensed optic bandwidth for data transmission, provide a promising alternative to alleviate the spectrum crisis. OWC technology also has many other attractive features such as worldwide availability, radiation-free, and high-capacity; thus, it is regarded as an appealing complementary communication solution for IoT applications.

According to the different optical carriers used by transmitters, OWC can be categorized into three main types, i.e., visible, infrared (IR) and ultraviolet (UV) light communications. OWC can also be classified based on the receiver types, including the photo detector and camera-based methods. A problem with conventional systems, however, is that they rely on an external power supply, such as a direct current (DC) power supply, which induces high maintenance cost and limits its applications where only the event trigger is needed to monitor. There are no feasible techniques to address this problem.

Therefore, there is a desire for improved OWC systems and methods that do not require the presence of an external power supply. Various embodiments of the present invention address this desire.

BRIEF SUMMARY OF THE INVENTION

The present disclosure relates to optical communication systems and methods. An exemplary embodiment provides an optical communication system, comprising a self-powered sensor and an optical array. The self-powered sensor can be configured to receive a mechanical input and generate an electrical signal corresponding to the mechanical input. The optical array can be configured to receive the electrical signal and generate an optical output. The optical output can correspond to the mechanical input.

In any of the embodiments disclosed herein, the self-powered sensor can comprise at least one triboelectric nanogenerator.

In any of the embodiments disclosed herein, the at least one triboelectric nanogenerator can be a double electrode contact-separation mode triboelectric nanogenerator having an unfixed mode.

In any of the embodiments disclosed herein, the mechanical input can be a force applied to the at least one triboelectric nanogenerator, and the optical output can have an intensity corresponding to a magnitude of the force.

In any of the embodiments disclosed herein, the mechanical input can be a force applied to the at least one triboelectric nanogenerator, and the optical output can have a frequency corresponding to a magnitude of the force.

In any of the embodiments disclosed herein, the optical array can comprise a plurality of light emitting diodes.

In any of the embodiments disclosed herein, the optical output can be an illumination of the plurality of light emitting diodes in a predetermined pattern.

In any of the embodiments disclosed herein, the predetermined pattern can be a sequence of illumination of the plurality of light emitting diodes.

In any of the embodiments disclosed herein, the plurality of light emitting diodes can comprise: a first light emitting diode configured to emit a first color of light; a second light emitting diode configured to emit a second color of light; and a third light emitting diode configured to emit a third color of light. The optical output can be an emission of light from the first, second, and third light emitting diodes at different intensities.

In any of the embodiments disclosed herein, the mechanical input can be a discrete input.

In any of the embodiments disclosed herein, the mechanical input can be an analog input.

In any of the embodiments disclosed herein, the system can further comprise an optical receiver configured to receive the optical output.

In any of the embodiments disclosed herein, the optical receiver can comprise a photodetector and/or a camera.

In any of the embodiments disclosed herein, the optical output can be a wireless optical output.

Another embodiment provides an optical communication method, comprising: receiving a mechanical input at a self-powered sensor; generating, with the self-powered sensor, and electrical signal corresponding to the mechanical input; receiving the electrical signal at an optical array; and transmitting, with the optical array, an optical output corresponding to the mechanical input.

In any of the embodiments disclosed herein, the method can further comprise: receiving the optical output at an optical receiver; and determining the mechanical input based on the received optical output.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIGS. 6A-E provides intensity-time plots for five users performing a "slide to unlock" action using an exemplary embodiment of the present invention.

DETAILED DESCRIPTION OF THE INVENTION

To facilitate an understanding of the principles and features of the present invention, various illustrative embodiments are explained below. To simplify and clarify explanation, the invention is described below as applied to triboelectric nanogenerators for converting a mechanical input to a wireless optical output. One skilled in the art will recognize, however, that the invention is not so limited. Instead, as those skilled in the art would understand, the various embodiments of the present invention also find application in other areas, including, but not limited to, any sensor for converting a mechanical input to an optical output.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

The triboelectric nanogenerator (TENG) is an emerging mechanical energy harvesting (or mechanosensing) technology that originates from the displacement current in the Maxwell's equations and can easily produce high-voltage up to thousands of volts. Such characteristics make it ideal for powering light-emitting diodes (LEDs) that have a threshold for operation voltage but require only a small amount of current. For example, a small TENG device (size of 1 in ×1 in) can easily light up tens of LEDs with a simple contact and separate operation. Therefore, the TENG may be employed as a competitive power supply for optical wireless communications (OWC) to wirelessly monitor mechanical stimuli.

Some embodiments described herein employ a self-powered, TENG-driven OWC system with the capability of wireless control, sensing, and authentication. With the integration of self-powered TENG-based sensing devices, a LED array can directly work as a wireless transmitter to convey the information associated with mechanical stimuli without additional electrical power supply. With different TENG devices and machine learning techniques, many applications for such systems can be realized, including, but not limited to, remote control/event monitoring, pressure sensing, and security authentication. These embodiments may greatly broaden the application of IoT through the integration of OWC and TENG.

Figure 1:
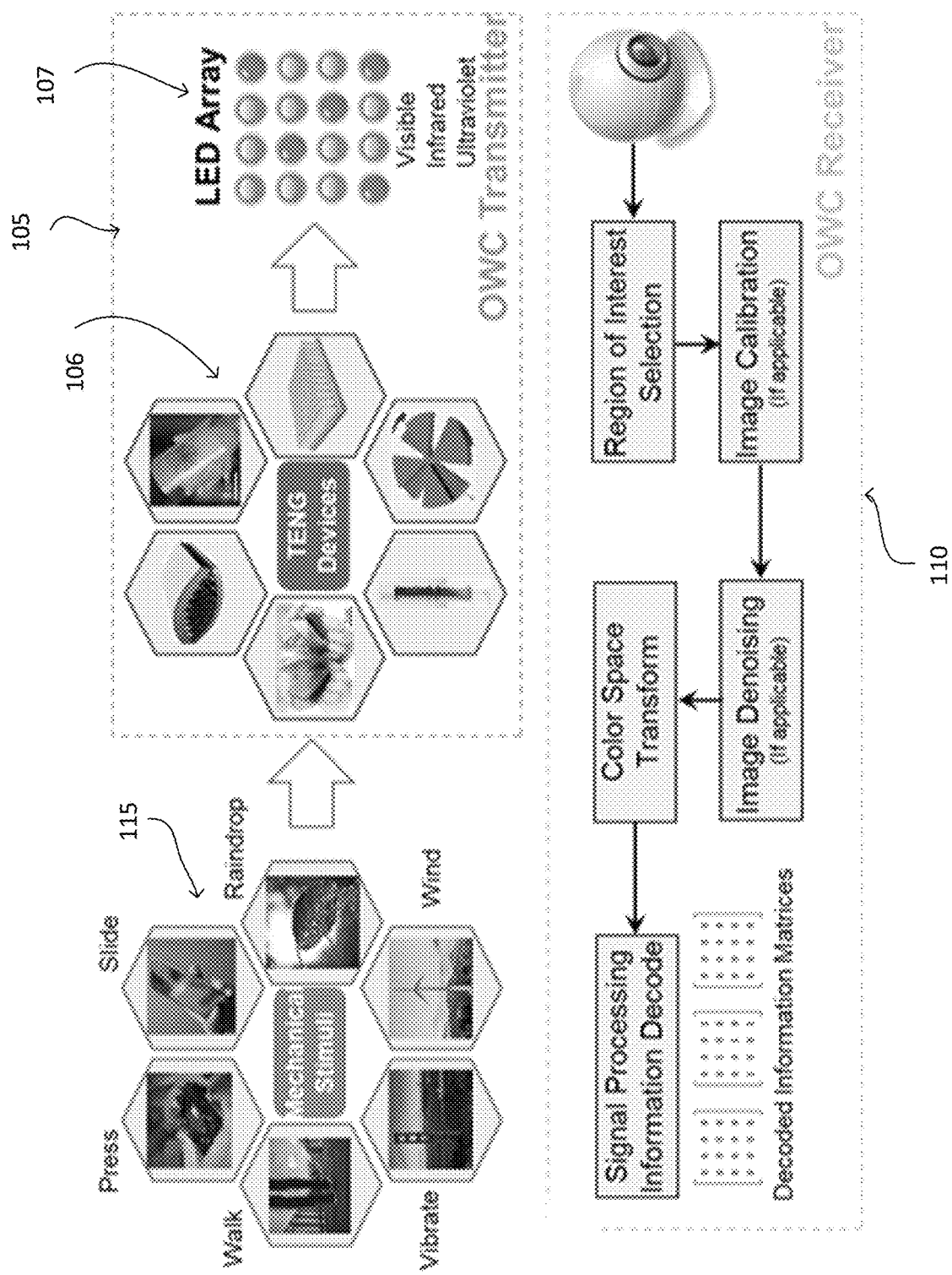
FIG. 1 provides a schematic illustration of a self-powered optical wireless communication system, in accordance with an exemplary embodiment of the present invention.

As shown in FIG. 1, an exemplary embodiment of the present invention provides a self-powered OWC system driven by a TENG sensor 106. The system can be generally divided into two sections, i.e., the transmitter 105 and the receiver 110. The transmitter 105 comprises a self-powered sensor 106, such a TENG, and an optical array 107, such as an LED array. The sensor 106, however, is not limited to a TENG; rather, the sensor can be many different self-powered sensors known in the art. As used herein, a sensor is self-powered if it does not require an external electrical power supply, such as a battery, the electric grid, and the like to generate an electrical response. Rather, a self-powered sensor can take the mechanical energy from a mechanical input (or stimuli) 115 and convert that mechanical energy into an electrical signal without any additional power supply.

The sensor 106 can be one or more sensors. For example, in some embodiments, the sensor 106 can be an array of multiple sensors. The multiple sensors can be the same type of sensor or different sensors. Additionally, each of the multiple sensors can be configured to receive different types of mechanical inputs 115, e.g., a discrete input (on/off) or an analog input (e.g., mechanical force applied to the sensor). As discussed above, many embodiments described herein employ one or more TENG devices as a sensor. In particular, some embodiments employ one or more double electrode contact-separation mode TENGs. In some embodiments, the mode of the TENGs is not fixed, meaning that any mode of the TENG can operate as a sensor.

The optical array 107 can be many different optical arrays known in the art. In some embodiments, the optical array comprises one or more light emitting diodes (LEDs). The optical array, however, is not limited to LEDs. Rather, the optical array can include any optical element for converting an electrical input to an optical output.

The transmitter 105 can be configured such that in response to a mechanical input 115, corresponding TENG units 106 are triggered and produce a high voltage output, which can easily power one to several LEDs 107 without any rectification or analog to digital conversion (ADC) modules. The optical array 107 (e.g., LEDs) then generates an optical output that corresponds to the received mechanical input 115. By associating the LEDs 107 with corresponding TENG units 106, the status information (e.g., location, elapsed time, force, and etc.) of the external mechanical stimuli 115 can be reflected by the optical output of the LEDs, e.g., "on-off" blinking of the corresponding LEDs. In other words, the TENG can work as both the event trigger and the power source for the OWC transmitted, such that the system does not require the presence of an additional electrical power source and eliminates the need of complicated power management circuits. Various types of mechanical events or triggers (for example, moving, pressing, vibrating, kicking or sliding) based on TENG are contemplated by the present invention. The LED size, power, and type (optical carrier band) can also be optimized according to the requirements of the specific applications.

As discussed above, the mechanical input 115 can be discrete or analog. For example, the sensor can be a pressure sensor that generates an electrical signal upon a mechanical input of a force above a predetermined threshold. That electrical signal can then generate an optical output indicating the sensor sensed a force above the predetermined threshold. No optical output would then mean no force above the threshold was sensed. In another embodiment, the pressure sensor can measure an analog mechanical input, such as the magnitude of the force sensed. The optical output can then correspond to the magnitude of force. For example, the intensity of the optical output can increase if the magnitude of the force increases by, for example, increasing a number of LEDs in the optical array that illuminate. The frequency of the optical output can also vary to correspond with the magnitude of the mechanical input (e.g., force). For example, LEDs in the optical array may blink at a higher rate in response to a greater magnitude of the mechanical input.

The optical output can be many different optical outputs. For example, as discussed above, the optical output can be an illumination of one or more LEDs. The intensity and/or frequency of the illumination can vary to correspond to the mechanical input. Additionally, in some embodiments, the optical array can comprise multiple LEDs (or other illumination elements), and those LEDs can illuminate in a predetermined pattern that corresponds to the mechanical input. In some embodiments, the predetermined pattern can be multiple LEDs illuminating simultaneously in a predetermined pattern. In some embodiments, the predetermined pattern can be multiple LEDs illuminating sequentially in a predetermined pattern. Additionally, the LEDs can comprise different colored LEDs. The optical output can cause a particular color of LED to illuminate corresponding to a particular mechanical input. In some embodiments, the different colored LEDs can be illuminated simultaneously at different intensities corresponding to the mechanical input. Such an embodiment can allow a different colored output to be generated based on the mechanical input.

As shown in FIG. 1, the system can further comprise an optical receiver 110 configured to receive the optical output. The optical receiver 110 can be any receiver configured to receive the optical input, including, but not limited to, a photo detector, a camera, and the like. For example, a camera can capture video (or one or more images) of the LED array at a configured frame rate (denoted as $f_p$ which is typically 30 frames per second). According to the Nyquist-Sampling theorem, the desired information signal conveyed by the LED blinking can be guaranteed for perfect recovery with appropriate signal processing as long as the desired signal frequency $f_i$ is less than half of the sampling rate, i.e., $f_i < f_p/2$. The subsequent information detection process in the OWC system can include the region of interest selection (extract the desired image region from the original picture to reduce the processing time of following steps), image calibration (make proper corrections to the image rotation caused by the receiver position), color space transformation (transform the image to other color space and enhance the desired information component), image processing (apply advanced techniques for further processing), and the final information decoding (obtain the desired information).

EXAMPLES

To illustrative purposes, and not for limitation, the concept of self-powered OWC systems of the present invention, three applications are described below. Those skilled in the art, however, would understand the present invention has many other applications and should not be construed as limited to these exemplary applications.

Self-Powered Wireless Remote Control

Figure 2A:
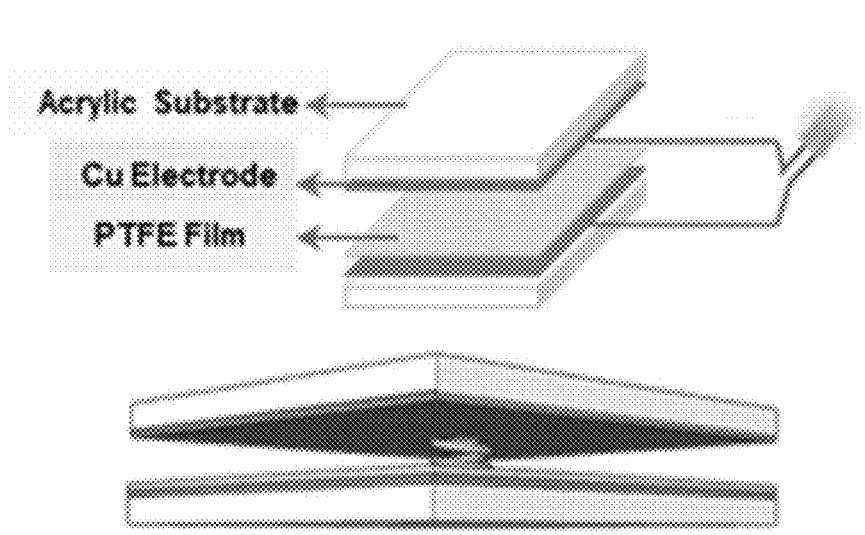
FIG. 2A provides a schematic of a triboelectric nanogenerator (TENG) sensor, in accordance with an exemplary embodiment of the present invention.
Figure 2B:
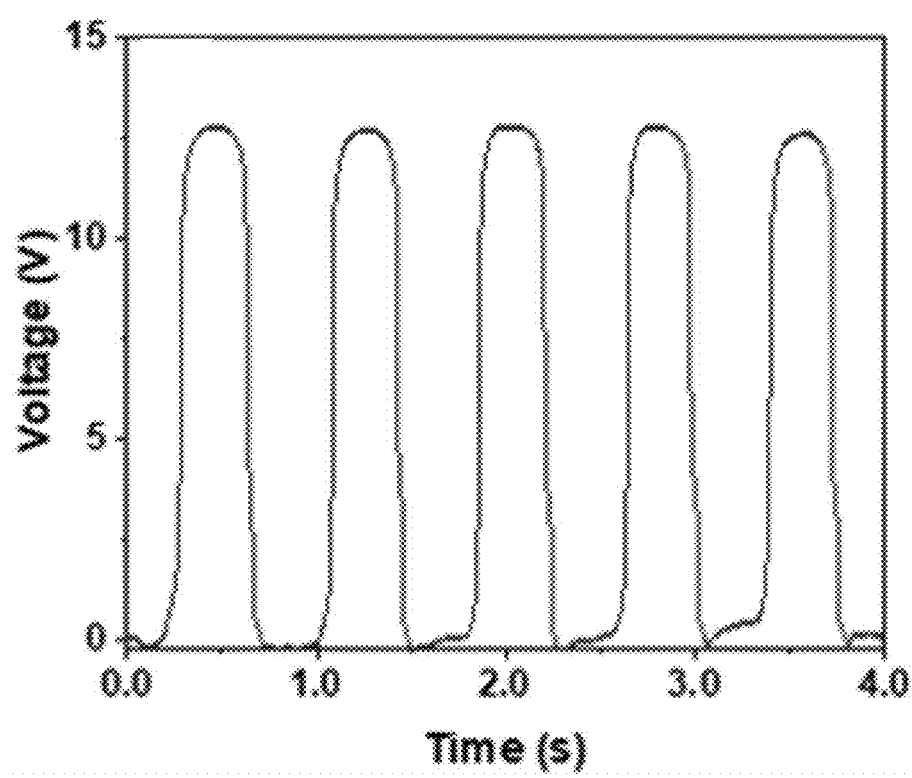
FIG. 2B provides a plot of an open-circuit voltage output of the TENG shown in FIG. 2A.

In this application, a self-powered OWC was used to realize a wireless remote control. A double-electrode contact-separation (CS) mode TENG (size of 1 in ×1 in) was fabricated as shown in FIG. 2A. The CS-TENG uses the copper foil and polytetrafluoroethylene (PTFE) film as the positive and negative triboelectric surfaces, respectively. The operation of the TENG is based on coupling between triboelectrification and electrostatic induction. Initially, the physical contact between two triboelectric layers of different materials creates opposite charges on the two surfaces in contact. Then as triggered by the mechanical force, the relative motion between opposite charges breaks the existing electrostatic balance, which builds a potential difference between the electrodes and drives free electrons in the electrodes to flow to rebalance the electrostatic field. When the layers move back, the electrons flow back to return to the original equilibrium. When a "press and release" mechanical force is applied to the TENG device, a pulsed voltage can be delivered, as illustrated in FIG. 2B. Then by wiring TENG to a LED, such voltage output will drive the LED to have a "on-off" behavior, which can be captured by the video camera (e.g., LifeCam Studio, Microsoft) at the receiver. It should be noted here that different modes or structures of TENG can be deployed separately or together, if various kinds of mechanical motions, for example, sliding, vibration and etc., need to be detected.

Figure 2C:
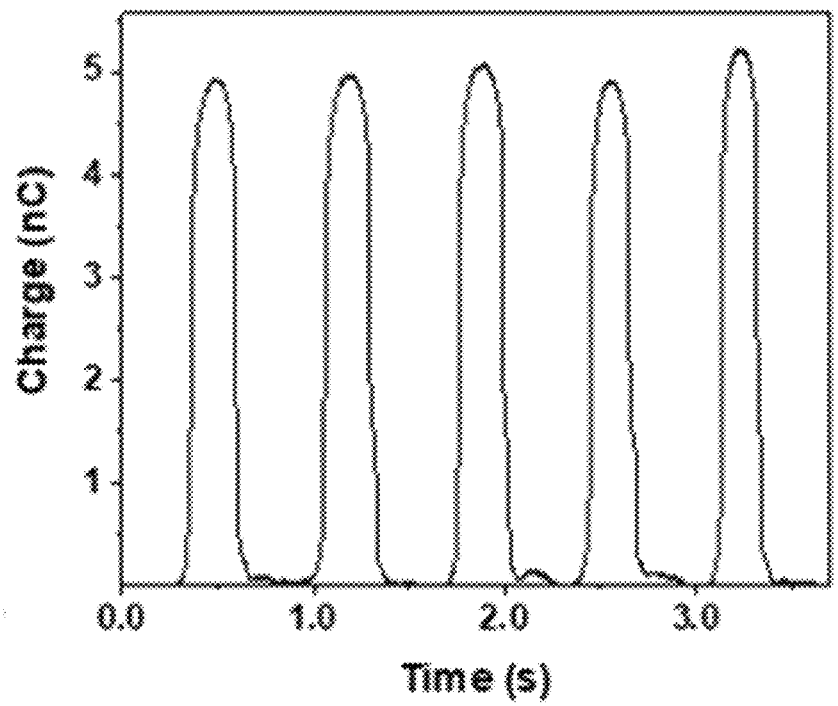
FIG. 2C provides a plot of a transferred charge amount of the TENG shown in FIG. 2A.
Figure 2D:
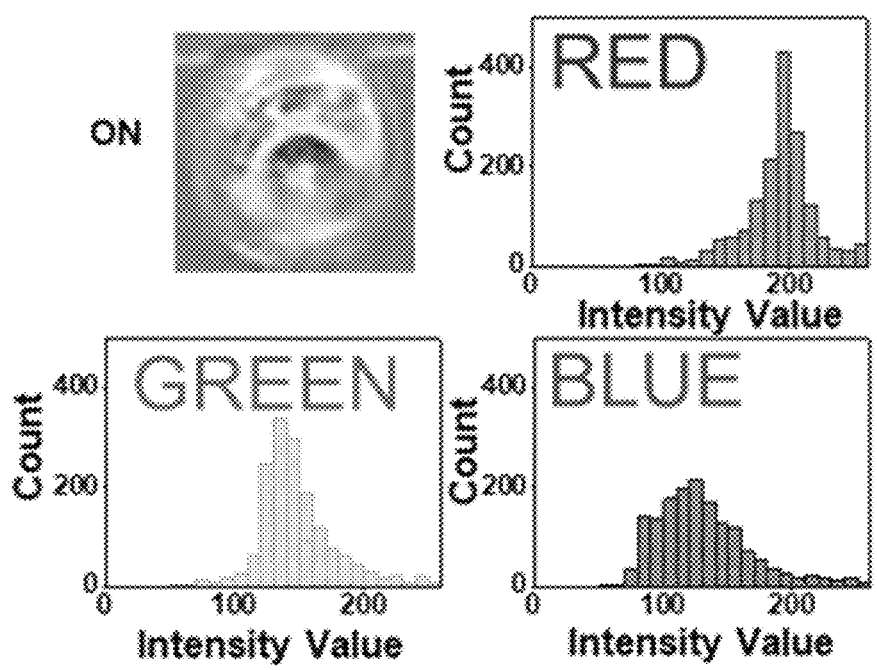
FIGS. 2D-E provides intensity histogram for a red-blue-green (RBG) color space of an "on" LED image and an "off" LED image, respectively.
Figure 2E:
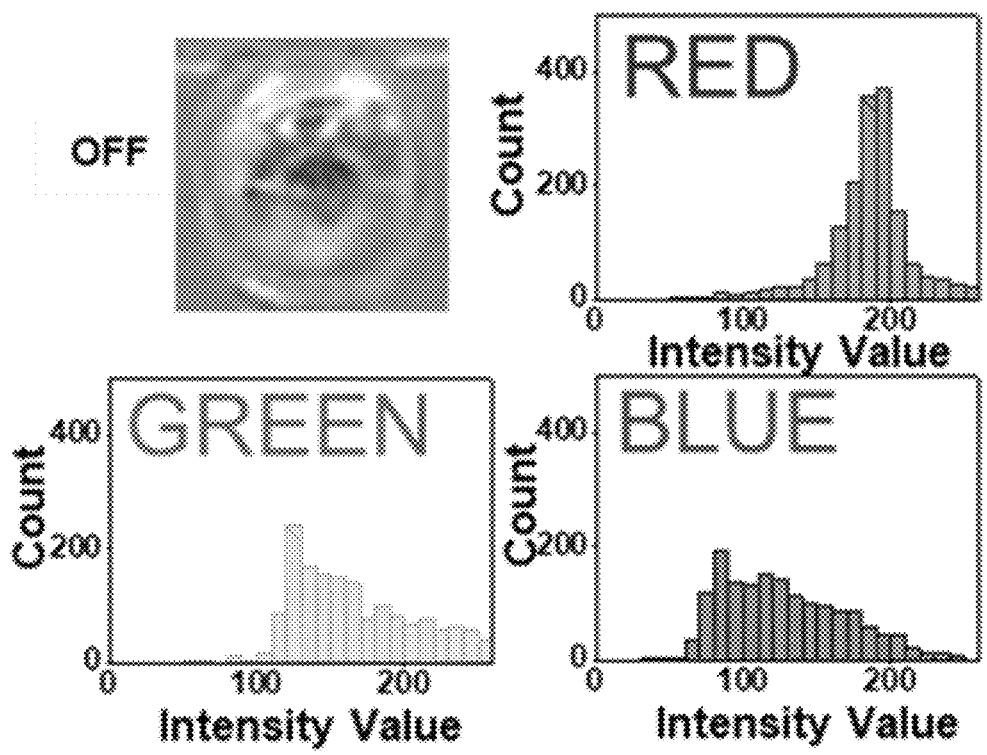

By analyzing the "on-off" status of the LED from the image captured in each frame, the mechanical motion can be detected and the remote control will be realized. Typical "on" and "off" LED images together with their intensity histogram of the red-green-blue (RGB) color space are shown in FIGS. 2B and 2C. Distinctive difference in the intensity distribution of the "on" and "off" images, especially in the green component intensity, can be observed. An adaptive intensity-threshold based algorithm can be used to realize the status judgement. FIGS. 2D and 2E illustrate the intensity histogram of the RGB color space of a typical "on" and "off" LED, respectively.'

Self-Powered Wireless Tactile Array for Pressure Detection

Figure 3A:
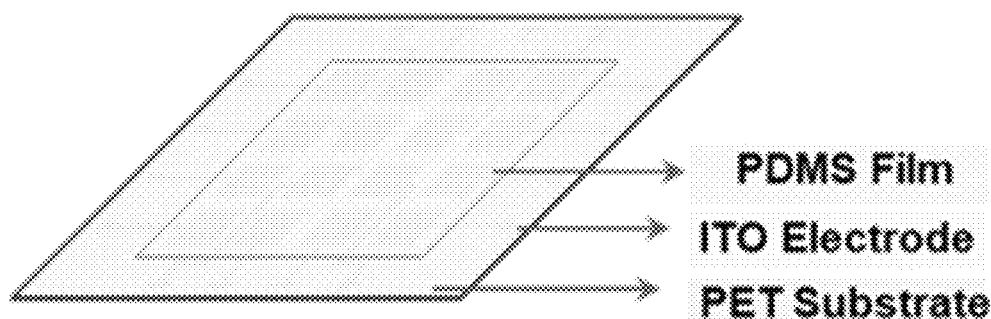
FIG. 3A provides a schematic diagram of a 4×4 TENG sensor, in accordance with an exemplary embodiment of the present invention.
Figure 5A:
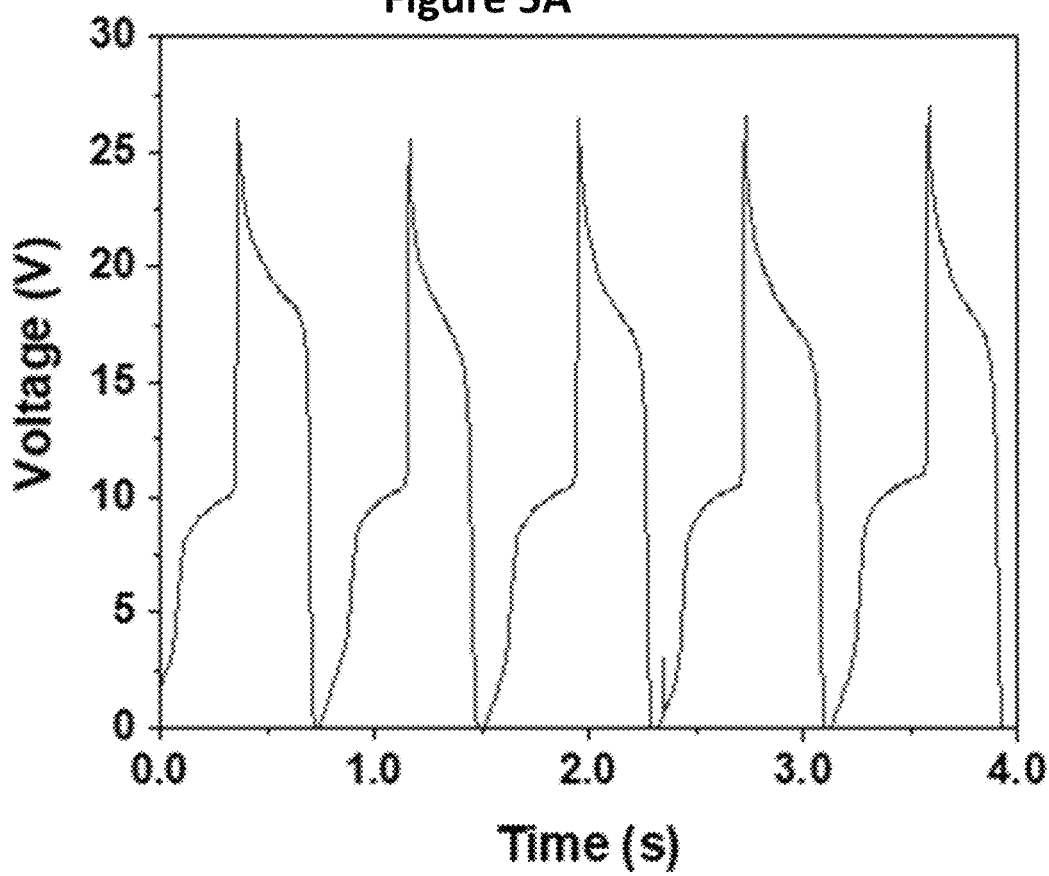
FIGS. 5A-5B provide plots of an open-circuit voltage and transferred charge, respectively, when pressing a taxel of an exemplary embodiment of the present invention.
Figure 5B:
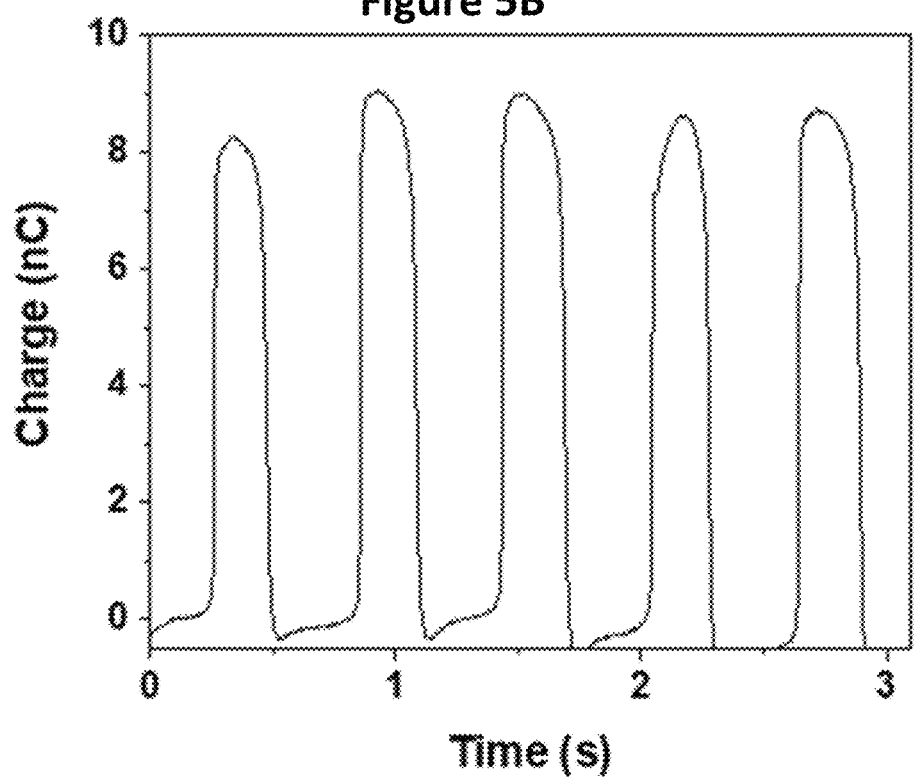

In this application, a self-powered OWC is utilized to realize wireless pressure detection. A TENG tactile array (touch panel) with 4×4 taxels was fabricated, and its structure is illustrated in FIG. 3A. Each taxel has a square size of 1 cm×1 cm. The touch panel uses indium tin oxide (ITO) as the electrode, a polydimethylsiloxane (PDMS) film as the triboelectric layer, and a PET film as the substrate, which provides transparency and flexibility. As shown in FIG. 3A, it is transparent and flexible, which is suitable for today's electronic trends. The working mechanism of this tactile array is based on the single-electrode contact-separation mode of TENG. In this case, the pressing object acts as the other triboelectric layer while a reference grounded electrode is taken as the other electrode. The output performance of the fabricated TENG tactile array is provided in FIGS. 5A and 5B, where the finger pressing is used as the mechanical stimulus for testing.

Figure 3B:
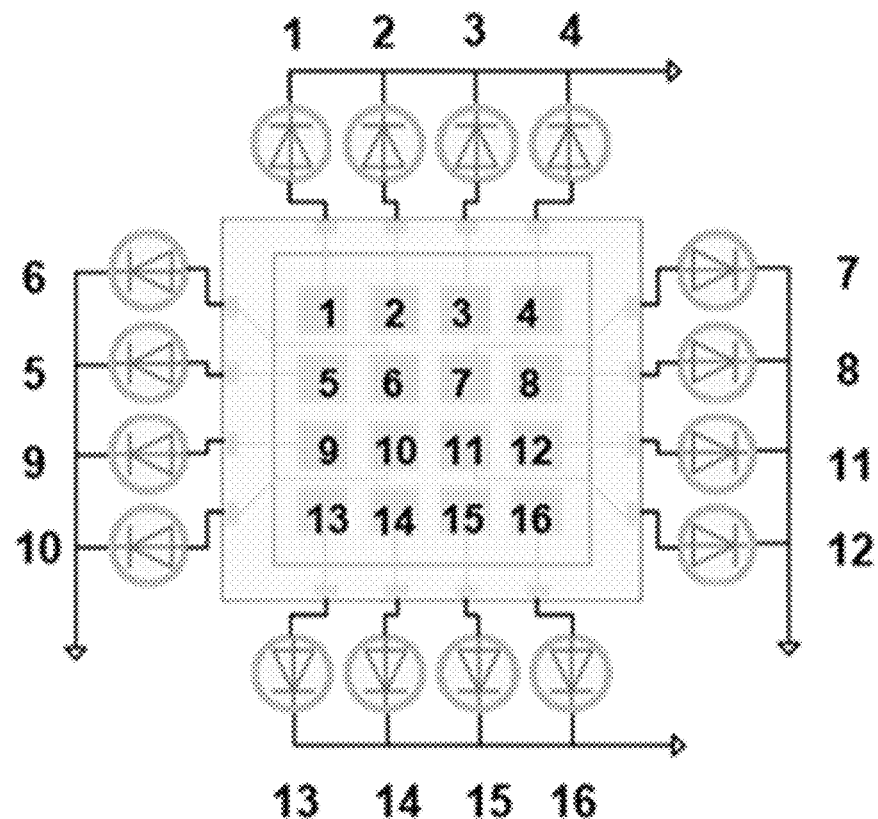
FIG. 3B provides a circuit diagram of the 4×4 TENG sensor shown in FIG. 3A, in accordance with an exemplary embodiment of the present invention.
Figure 3D:
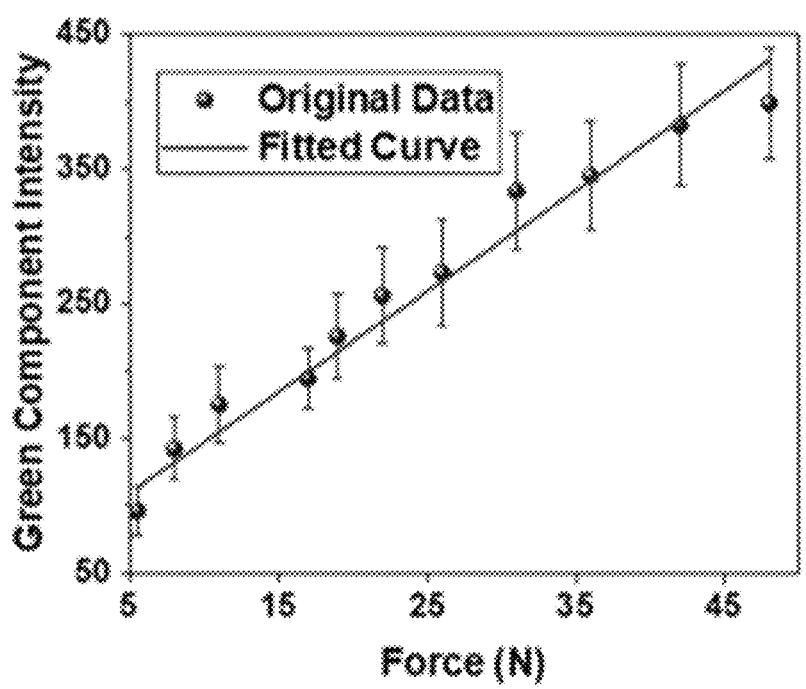
FIG. 3D illustrates a relationship between a green component intensity detected from the captured LED image and a force applied to the corresponding taxel.
Figure 3C:
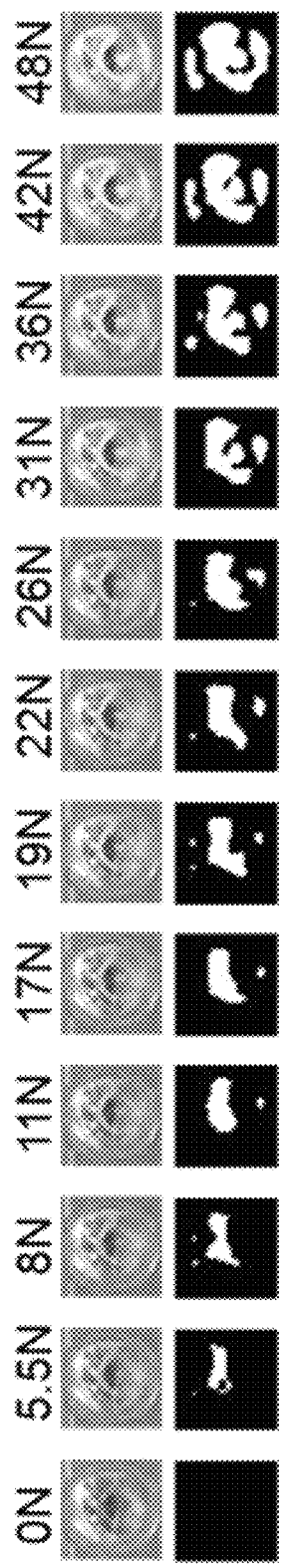
FIG. 3C provides LED images and corresponding green component intensity images after processing at different force s applied a tactile pixel.
Figure 3E:
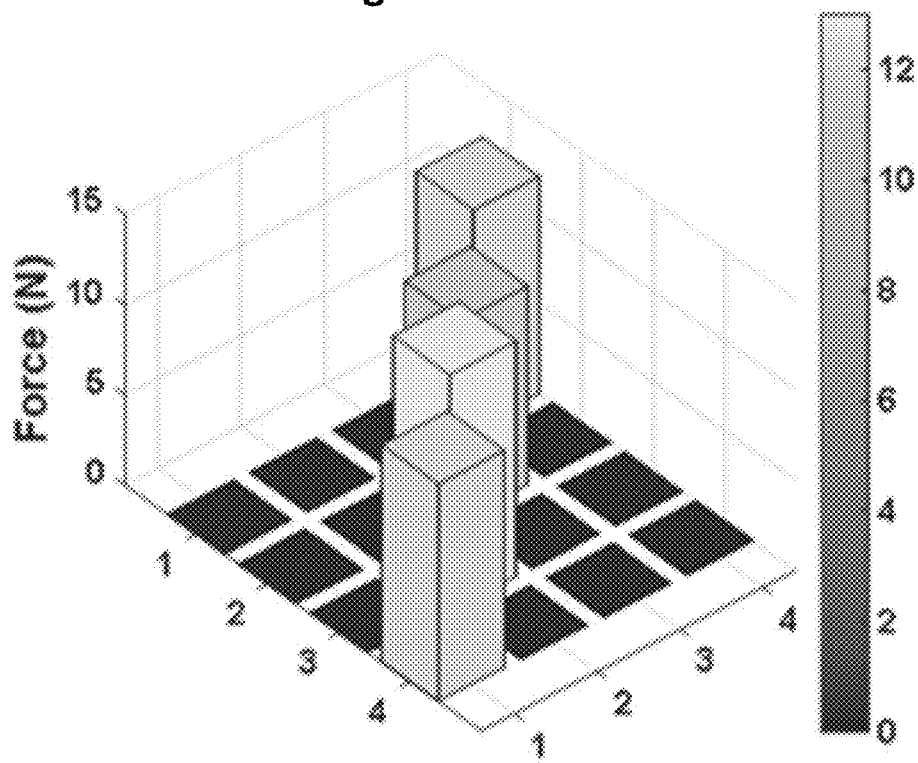
FIG. 3E illustrates a detected force output based on the relationship shown in FIG. 3D when the four taxels on the diagonal of the 4×4 TENG shown in FIG. 3A were pressed simultaneously.

The circuit diagram is shown in FIG. 3B, where each taxel is wired to a corresponding LED. The output voltage of each touching is proportional to the pressing force to a certain extent. The higher the driving voltage is, the brighter the LED will be. Since green light LEDs were used in this application, the brighter light would contain stronger green component. Typical LED images and the corresponding green component intensity images after processing at different forces applied to the taxel are provided in FIG. 3C. The white area in the intensity image is used to indicate the intensity of the green component: the larger the white area, the higher the intensity of the green component. Additionally, experiments were conducted to quantify the relationship between the green component intensity in the captured LED image and the applied force, which gives a great linearity as in FIG. 3D. As a tactile array, the system can detect the magnitudes of forces applied to different taxels simultaneously. When four taxels on one diagonal of the tactile array were pressed with four fingers, the detected intensity can clearly reflect the force distribution, as shown in FIG. 3E.

Self-Powered Wireless Touch Panel for User Authentication/Identification

Figure 5C:
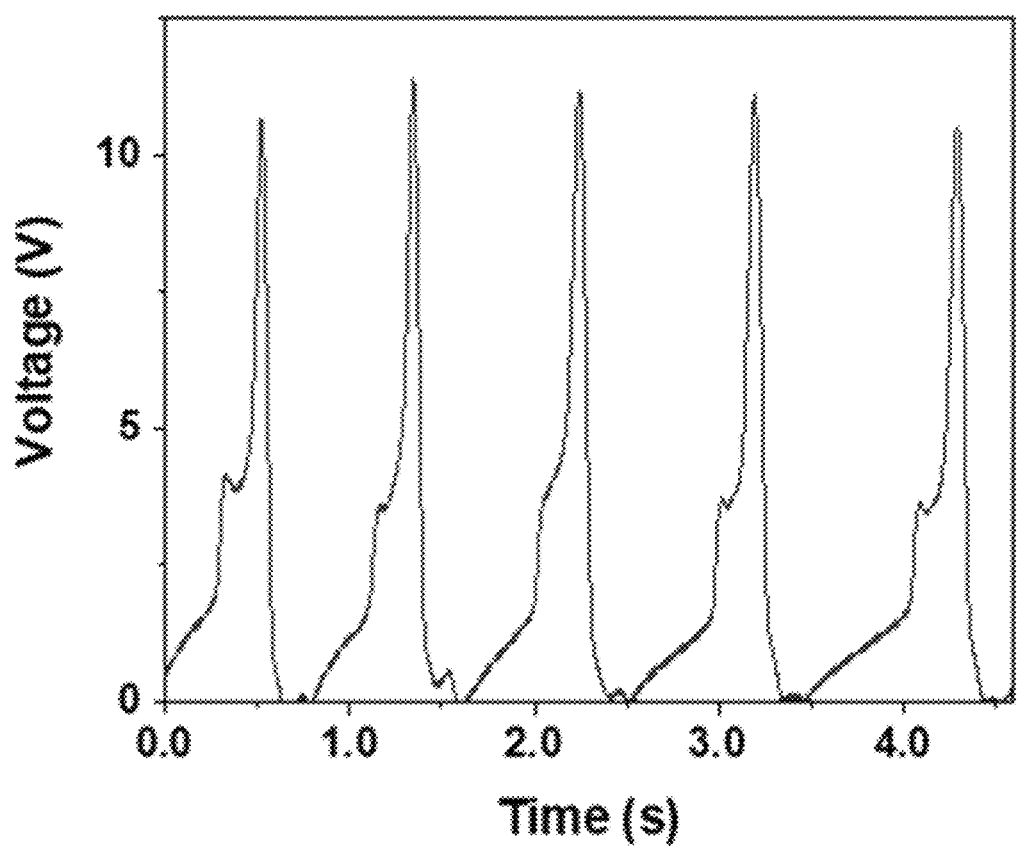
FIGS. 5C-D provide plots of an open-circuit voltage and transferred charge, respectively, when sliding a taxel of an exemplary embodiment of the present invention.
Figure 5D:
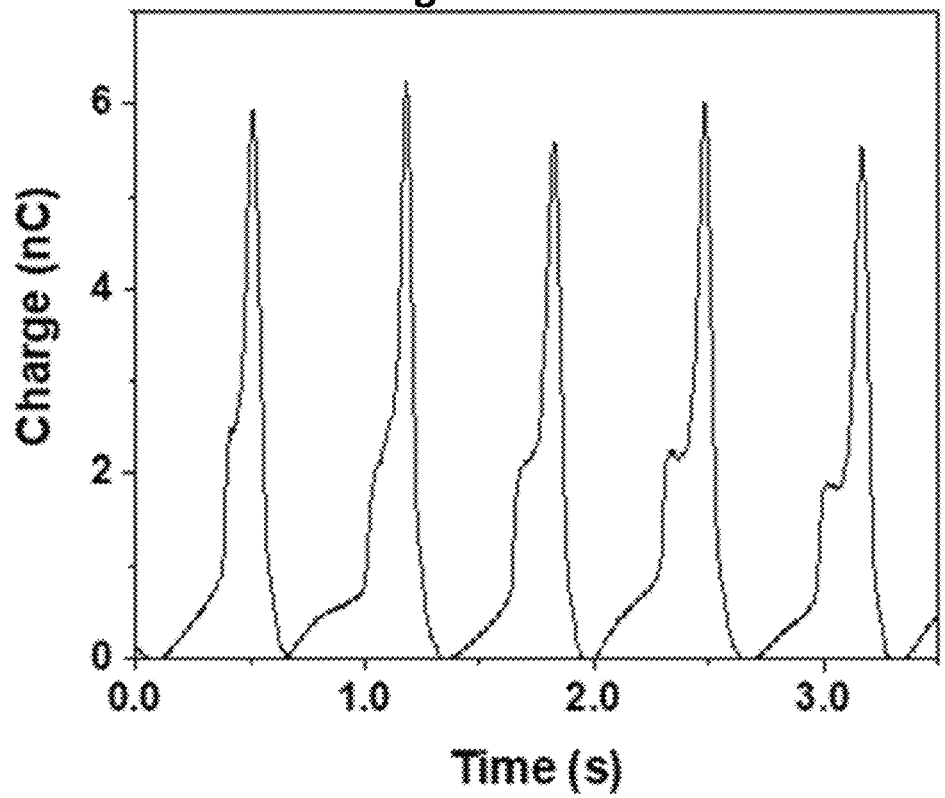
Figure 6A:
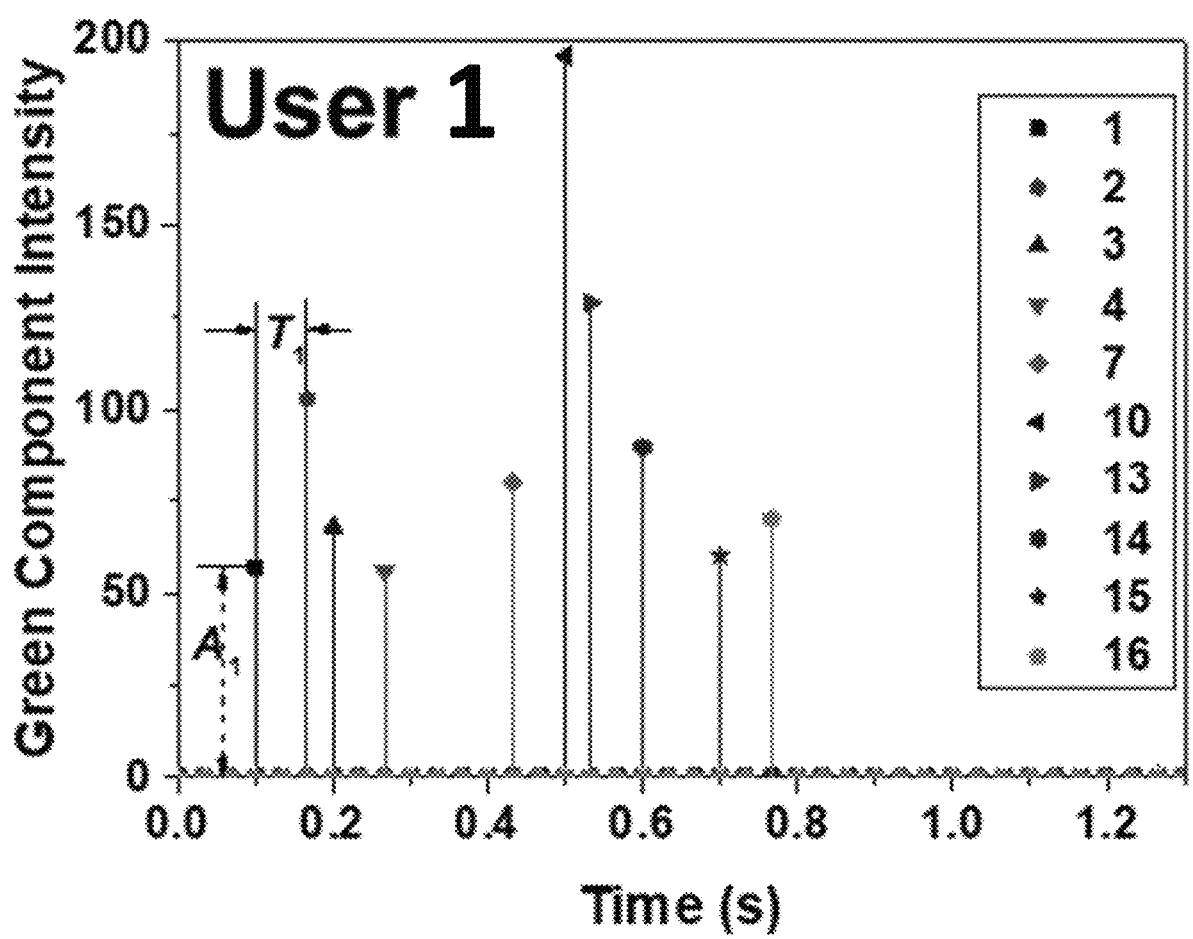
Figure 6B:
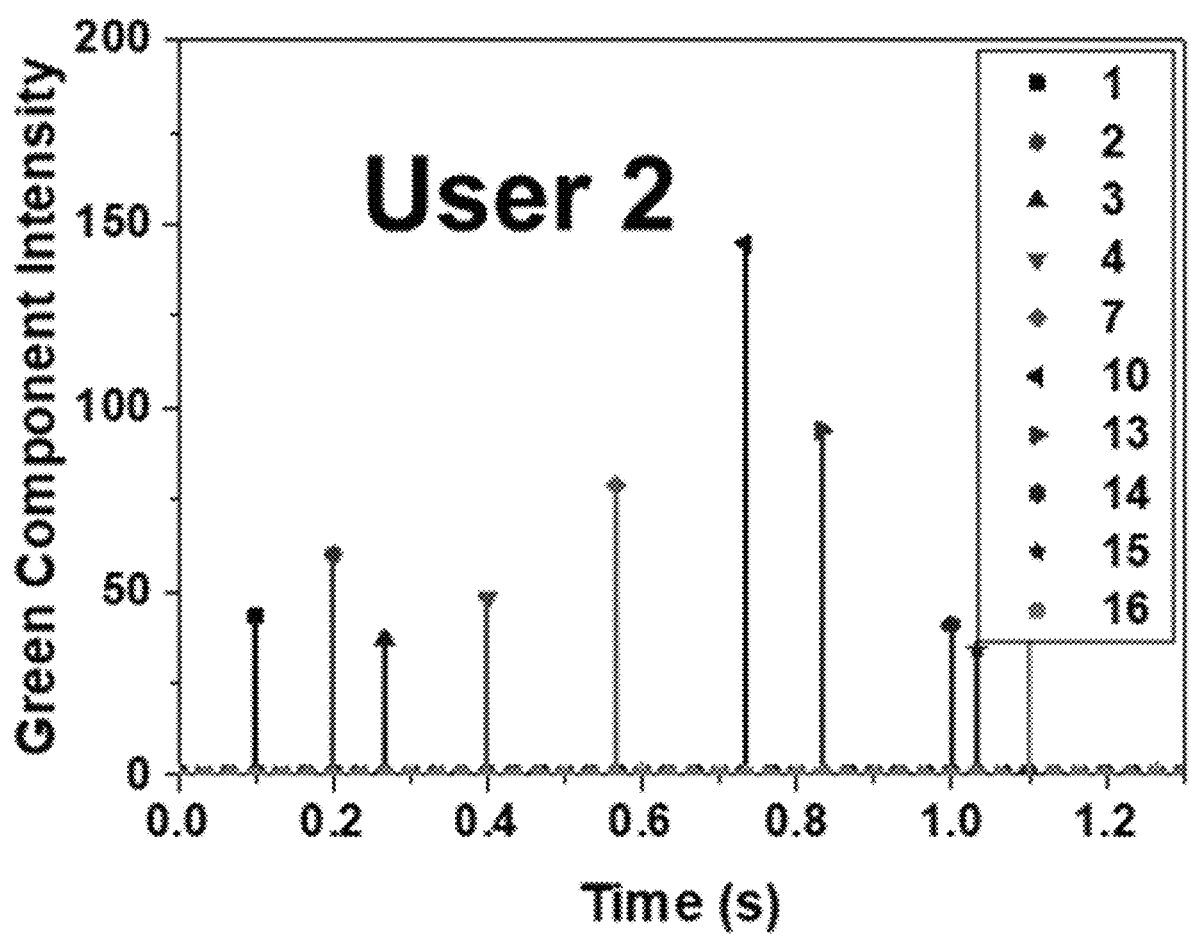

In this application, a self-powered OWC is utilized to realize user authentication/identification. Specifically, the tactile array fabricated in the application above can also be used to sense the sliding motion on it and power the LED array. The voltage generation mechanism here is based on the single-electrode sliding mode of TENG, and the output performance is illustrated in FIGS. 5C and 5D, where the finger sliding is adopted as the mechanical stimulus for testing. The users' sliding biometrics, including the touching force and the sliding speed, can be captured by this OWC system. Therefore, the device can work as an intelligent interface for authentication or identification to distinguish the users even with the same sliding password.

Figure 4A:
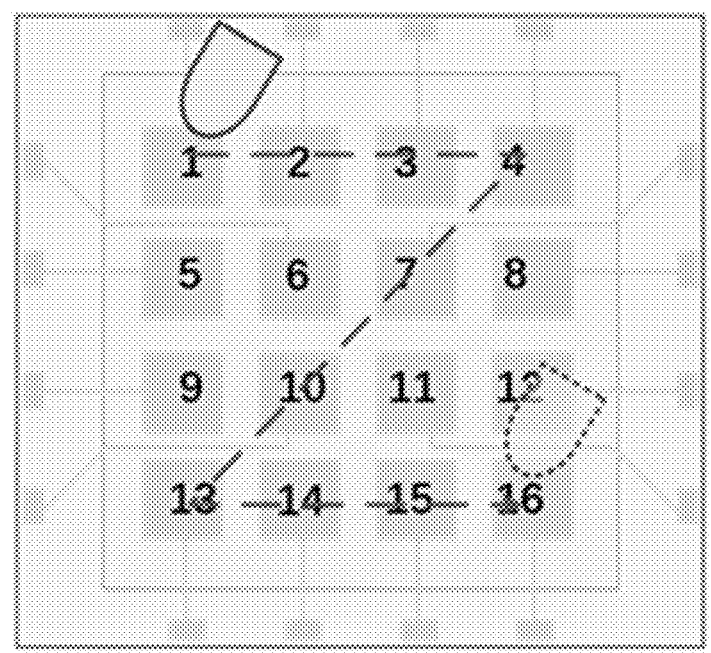
FIG. 4A-4B provides a schematic diagram of a z-type "slide to unlock" action on a TENG based touch panel and the corresponding response of the connected LED array, respectively, in accordance with an exemplary embodiment of the present invention.
Figure 4B:
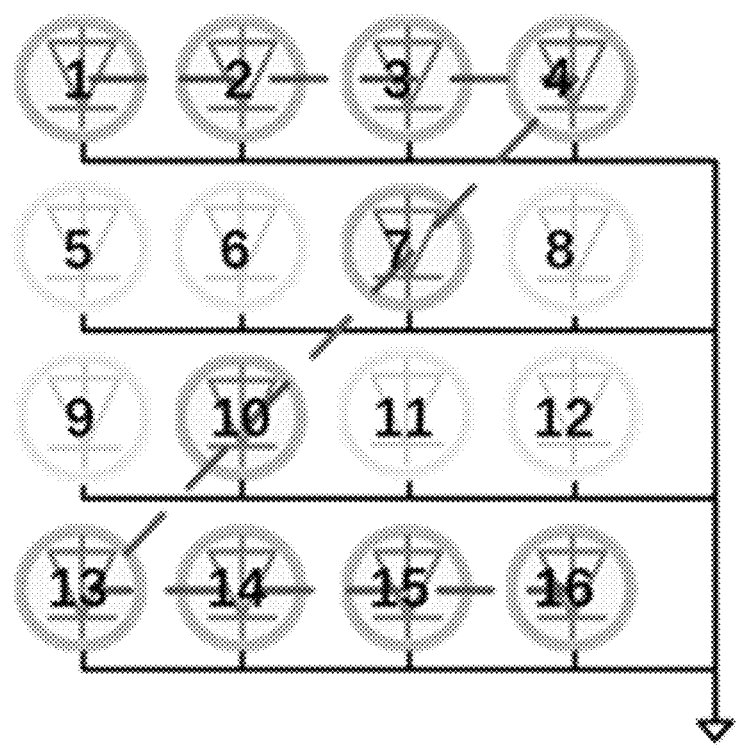
Figure 4C:
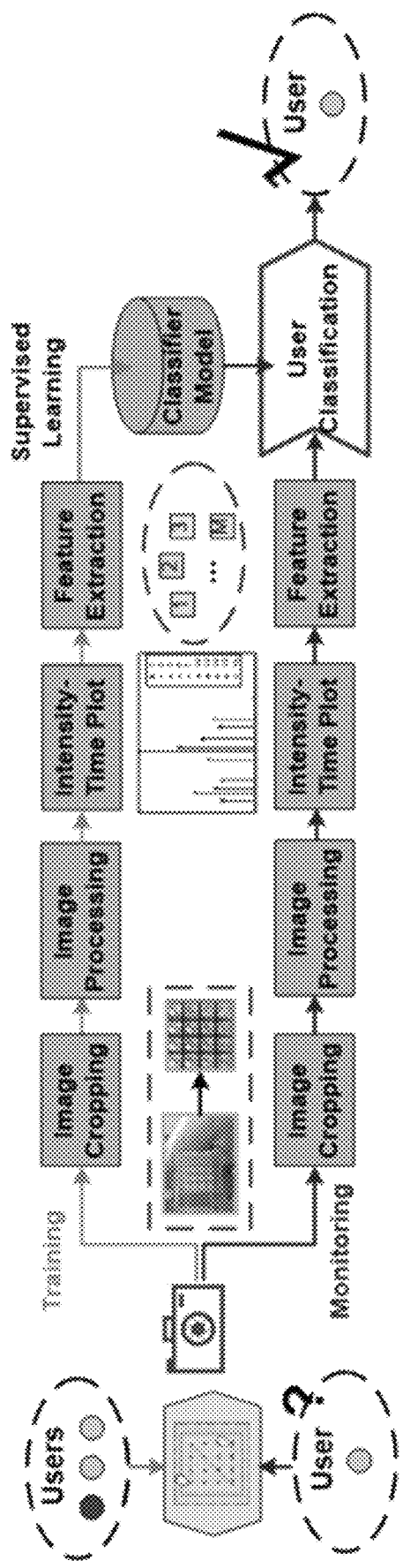
FIG. 4C provides a flow diagram of an exemplary algorithm for user authentication/identification based on a supervised machine learning scheme, in accordance with an exemplary embodiment of the present invention.
Figure 4D:
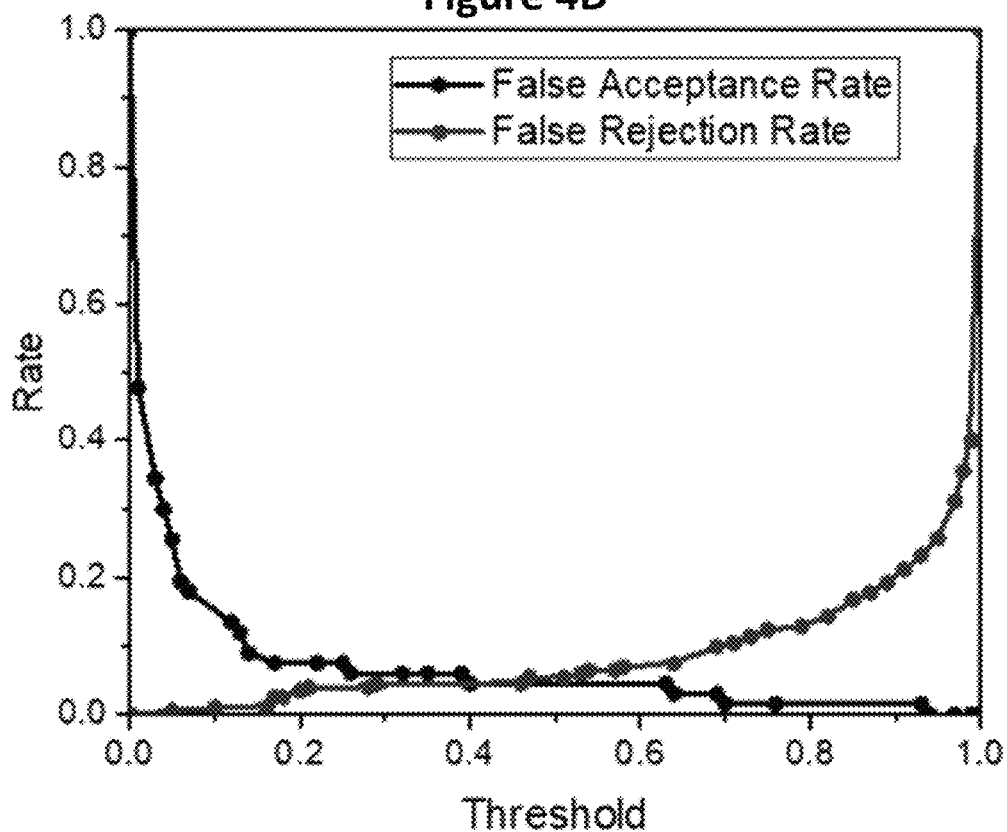
FIG. 4D provides a plot of false acceptance rate (FAR) and false rejection rate (FRR) with respect to different threshold values, in accordance with an exemplary embodiment of the present invention.
Figure 4E:
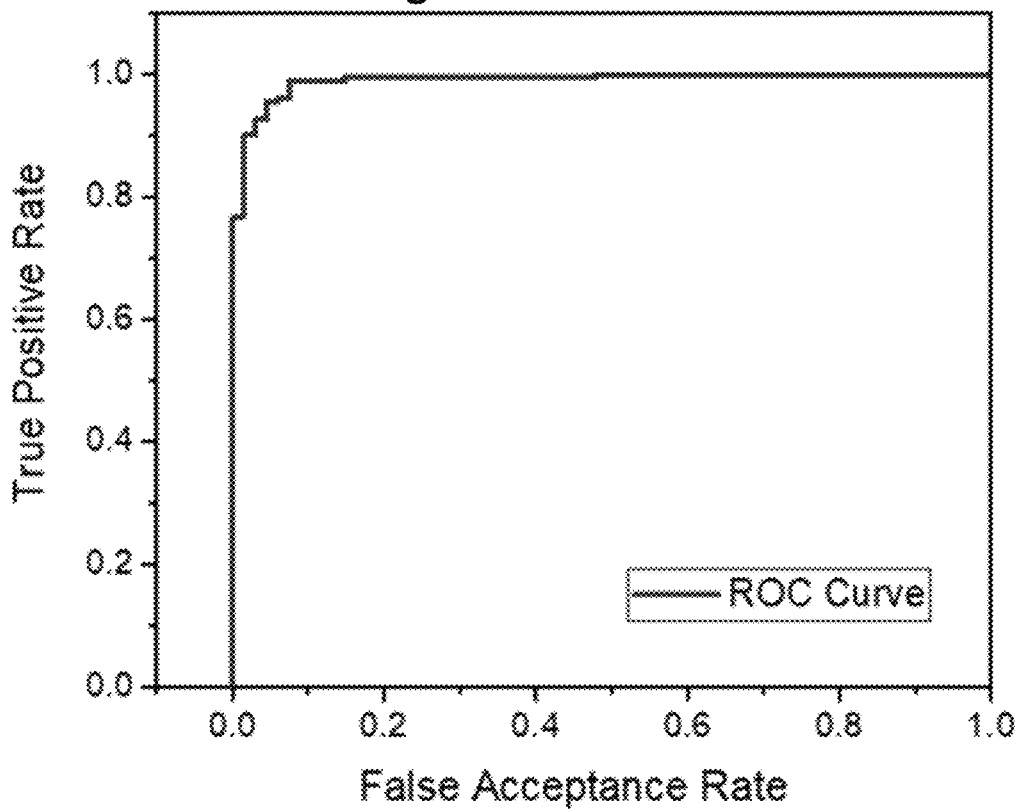
FIG. 4E provides a plot of a receiving operating curve (ROC), in accordance with an exemplary embodiment of the present invention.

In this work, five people were invited repeatedly to slide a z-type password on the touch panel (FIG. 4A) for 50 times each. The LED array were lighted accordingly, as illustrated in FIG. 4B. FIGS. 6A-E shows the detected intensity-time plots of different users. Two factors of user biometrics can be extracted from these plots, e.g., the signal magnitudes (denoted as A, reflecting the touching force) and the sliding latencies (denoted as T, reflecting the sliding speed). For the z-type sliding across the "1-2-3-4-7-10-13-14-15-16" taxels, a total of 19 features can be obtained accordingly, i.e. 10 signal magnitudes and 9 sliding latencies. To improve the accuracy and robustness of the authentication and identification, supervised machine learning was used to build up the user profiles for classification. The working process is illustrated in FIG. 4C. The 50 sets of data from each user were randomly split into two halves, one for training and the other for testing. The classifier performance was optimized by tuning the decision threshold value and comparing the resulting false rejection rate (FRR) and false acceptance rate (FAR). With the optimal decision threshold of 0.44, the tradeoff between a low FRR and a low FAR can be well satisfied so that an equal error rate (EER) as low as 0.92 can be achieved (see FIG. 4D). A standardized receiver operating characteristic (ROC) curve (FIG. 4E), defined as the plot of the true positive rate (TPR) against the FAR at various threshold settings, is calculated and gives an enclosed area of 0.989 (the closer to 1, the better), indicating a good classifier. In this condition, the classifier has the accuracy of 95.2%.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. An optical communication system comprising:
a double electrode contact-separation mode triboelectric nanogenerator having an unfixed mode and configured to receive a mechanical input and generate an electrical signal corresponding to the mechanical input; and
an optical array configured to receive the electrical signal and generate an optical output, the optical output corresponding to the mechanical input.

2. The optical communication system of claim 1, wherein the mechanical input is a discrete input.

3. The optical communication system of claim 1, wherein the mechanical input is an analog input.

4. The optical communication system of claim 1 further comprising an optical receiver configured to receive the optical output.

5. An optical communication system, comprising:
at least one triboelectric nanogenerator configured to receive a mechanical input and generate an electrical signal corresponding to the mechanical input; and
an optical array configured to receive the electrical signal and generate an optical output, the optical output corresponding to the mechanical input;
wherein the mechanical input is a force applied to the at least one triboelectric nanogenerator; and
wherein one or both:
the optical output has an intensity corresponding to a magnitude of the force; and
the optical output has a frequency corresponding to a magnitude of the force.

6. The optical communication system of claim 5, wherein the optical array comprises a plurality of light emitting diodes.

7. The optical communication system of claim 6, wherein the optical output is an illumination of the plurality of light emitting diodes in a predetermined pattern.

8. The optical communication system of claim 7, wherein the predetermined pattern is a sequence of illumination of the plurality of light emitting diodes.

9. The optical communication system of claim 6, wherein the plurality of light emitting diodes comprises:
a first light emitting diode configured to emit a first color of light;
a second light emitting diode configured to emit a second color of light; and
a third light emitting diode configured to emit a third color of light;
wherein the optical output an emission of light from the first, second, and third light emitting diodes at different intensities.

10. The optical communication system of claim 5, wherein the mechanical input is a discrete input.

11. The optical communication system of claim 5, wherein the mechanical input is an analog input.

12. The optical communication system of claim 5, further comprising an optical receiver configured to receive the optical output.

13. The optical communication system of claim 12, wherein the optical receiver is a photodetector and/or a camera.

14. The optical communication system of claim 5, wherein the optical output is a wireless optical output.

15. An optical communication method comprising:
receiving a mechanical input at a self-powered sensor;
generating, with the self-powered sensor, an electrical signal corresponding to the mechanical input;
receiving the electrical signal at an optical array;
transmitting, with the optical array, an optical output corresponding to the mechanical input;
receiving the optical output at an optical receiver; and
determining the mechanical input based on the received optical output.

16. The method of claim 15, wherein the mechanical input is one or a discrete input and an analog input.

17. The method of claim 15, wherein the self-powered sensor comprises at least one triboelectric nanogenerator.

18. The method of claim 15, wherein the optical array comprises a plurality of light emitting diodes; and
wherein the optical output comprises an illumination of the plurality of light emitting diodes in a pattern.

19. The method of claim 15, wherein the self-powered sensor comprises a double electrode contact-separation mode triboelectric nanogenerator having an unfixed mode.

* * * * *